United States Patent [19]

Taylor

[11] Patent Number: 4,526,447

[45] Date of Patent: Jul. 2, 1985

[54] BEAM DIRECTING MICROMANIPULATOR FOR LASER DEVICE

[75] Inventor: Wilhelm Taylor, Colorado Springs, Colo.

[73] Assignee: Xanar, Inc., Colorado Springs, Colo.

[21] Appl. No.: 493,091

[22] Filed: May 7, 1983

[51] Int. Cl.³ .......................... G02B 7/18; G02B 17/00
[52] U.S. Cl. ..................... 350/636; 350/484; 128/303.14; 219/121 LU; 248/484
[58] Field of Search .............. 350/301, 299, 288, 484, 350/6.5; 219/121 LW, 121 LU, 121 LG, 121 LJ; 128/303.1, 303.14; 33/23 R; 248/479, 480, 481, 484

[56] References Cited

U.S. PATENT DOCUMENTS

| | | | |
|---|---|---|---|
| 3,140,339 | 7/1964 | Nisperly et al. | 350/301 |
| 3,769,963 | 11/1973 | Goldman et al. | 219/121 LG |
| 3,907,436 | 9/1975 | Wolga | 350/484 |
| 3,910,276 | 10/1975 | Polanyi et al. | 128/303.1 |
| 3,936,942 | 2/1976 | Belew et al. | 350/288 |
| 4,091,814 | 5/1978 | Togo | 128/303.1 |
| 4,218,037 | 8/1980 | Palamountain | 248/481 |
| 4,293,112 | 10/1981 | Horton | 350/288 |

FOREIGN PATENT DOCUMENTS

| | | | |
|---|---|---|---|
| 7734 | 1/1982 | Japan | 350/307 |
| 2071035 | 9/1981 | United Kingdom | 350/307 |

*Primary Examiner*—Jon W. Henry
*Attorney, Agent, or Firm*—Audley A. Ciamporcero, Jr.; Michael A. Kaufman

[57] ABSTRACT

A beam deflecting assembly in a laser device for precision manual control of the point of impact of a laser beam on a selected target site. The assembly includes a pivotable joy-stick universally coupled to an angled manipulator arm which in turn is pivotably connected to a mirror mount in which a beam deflecting mirror is mounted. The mount is rotatable about a vertical axis and includes a yoke for pivoting the mirror about a horizontal axis. Deflection of the joy-stick in the horizontal direction results in rotation of the mount and, independently, deflection in the vertical axis results in pivoting the mirror mount about the horizontal axis. The components of the assembly are dimensioned such that a movement in the free end of the joy-stick is reflected in a corresponding displacement in angle and distance in the point of impact of the delivered laser beam on a selected target plane to give the operator of the laser device a sense of direct control of the beam.

2 Claims, 13 Drawing Figures

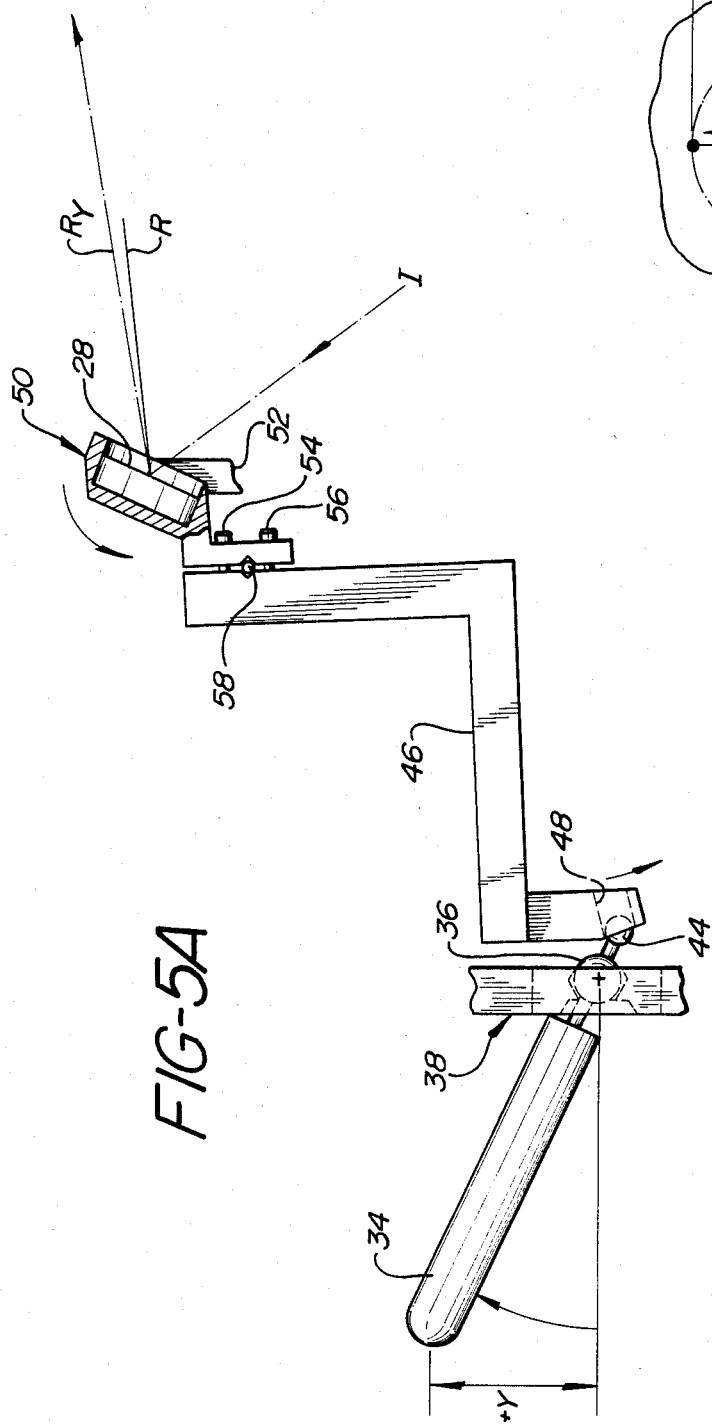
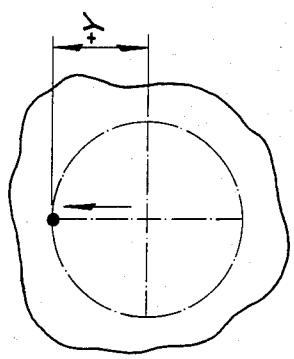
FIG-5A
FIG-5B

BEAM DIRECTING MICROMANIPULATOR FOR LASER DEVICE

TECHNICAL FIELD

The present invention relates to an apparatus for delivering laser energy in the form of a laser beam to tissues for the purpose of medical intervention in a number of clinical applications and particularly to a micromanipulator for precision control of the direction of the laser beam.

BACKGROUND ART

The development of the laser in 1960 opened the possibility of the application of this form of energy in a number of medical disciplines. Lasers offer the advantages of high power, narrow spectral widths, small focused spot sizes, and good absorption of the energy by the target tissues. Since then, numerous lasers of different wavelengths and modes of operation have been developed, and many of these have been used in specific medical applications. For example, the argon laser, with emission in the blue-green part of the visible portion of the electromagnetic spectrum, has found extensive use in ophthalmology because of its good transmission by the ocular media and good absorption by the target tissues in the retina and choroid.

Among the many lasers that have been developed, however, the carbon dioxide laser, with its emission wavelength of 10.6 microns, offers the most extensive range of applications in medicine because it is highly absorbed by all tissues of the body. For this reason, by focusing the carbon dioxide laser on tissues, it is possible to photocoagulate, to cut, or to vaporize almost any tissue of the body. The carbon dioxide laser has been applied to a number of medical problems in various disciplines—including otolaryngology, gynecology, neurology, dermatology, and in plastic and general surgery.

In the field of gynecology, the carbon dioxide laser has been used almost exclusively for medical intervention in a number of disorders. The laser is used for making incisions, to coagulate small arteries and veins, and to vaporize tumors and other abnormal tissues.

A number of instruments have been developed for use in the field of gynecology. These devices typically comprise a console that contains the power supplies, vacuum pump, gas tanks, and water pump and heat exchanger, for operating the laser. An umbilical cord is typically used to connect the console with a laser head that is directly coupled to a colposcope or an operating microscope, supported by a stand that is free standing or is connected to the console. The operating microscope is typically mounted on an optical head assembly which may be provided with a micromanipulator—more popularly, a joy-stick—to permit the operating physician free control of the locus of impact of the beam on the target site.

In such laser systems, the laser energy is produced in a laser head and is transmitted to the target site by a series of redirecting mirrors. The last mirror in the path is linked mechanically to the joy-stick to permit the desired manipulation. To permit the desired movement of the beam on a target plane separated a specified distance such as, for example, a foot from the viewing optics of the operating microscope, the mechanical linkage between the micromanipulator and the last mirror must provide for two degrees of freedom, conveniently referred to as the x and y axis. A problem arises, however, in linking the micromanipulator to the last mirror. If the axis of rotation of the mirror is normal to the plane of the incident and reflected laser beam, then each degree of rotation of the mirror results in a two degree change in the direction of the deflected beam (y axis); however, if the rotation of the mirror is about an axis lying within the plane of travel of the beam, then each degree of mirror rotation is matched by one degree of beam deflection (x axis). Thus, direct linkage of the micromanipulator to this last mirror without compensation results in a distortion in one dimension so that if the micromanipulator were to trace a circle, the deflection of the laser beam by the mirror would trace an ellipse whose minor axis corresponded to the radius of the circle.

SUMMARY OF THE INVENTION

I have invented a precision beam directing micromanipulator for a surgical laser system in which the operator's manual movement is reproduced exactly by a like amount of displacement by the laser beam in either the x or y axis on the target plane, and I have done this without using any springs or complex linkages.

In a preferred mode, my micromanipulator comprises a manipulator handle connected to a universal pivot assembly by a first sphere which serves as the reference point for the movement of the handle. Attached to the first sphere on the side opposite the exposed handle is a smaller sphere whose movement is always opposite that of the manipulator handle. The smaller sphere is coupled to an angled brass manipulator arm which is provided with a slanted cylindrical opening at one end portion thereof. The other end of the manipulator arm is connected to a mirror mount housing a beam redirecting mirror. The mount permits the mirror the necessary two degrees of freedom to deflect the exiting laser beam a prescribed amount in the x and y directions. The brass manipulator arm is free-floating and is designed to precisely compensate for the above-noted y axis distortion while at the same time yielding the one-to-one relationship in x axis movement. In the preferred embodiment, the slant of the cylindrical opening in the manipulator arm is 13 degrees relative to the horizontal, but it will be appreciated that this angle is a function of the dimensions of a specific system.

BRIEF DESCRIPTION OF THE DRAWINGS

FIG. 3A is a view taken along line 3A—3A of FIG. 3;

FIG. 5A is a schematic elevational view showing the manipulator handle deflected in the vertical orientation;

FIG. 5B is a schematic view of a section of the target plane showing the incidence of the laser beam on the target plane corresponding to the position of the manipulator handle in FIG. 5A;

DETAILED DESCRIPTION

Figure 1:
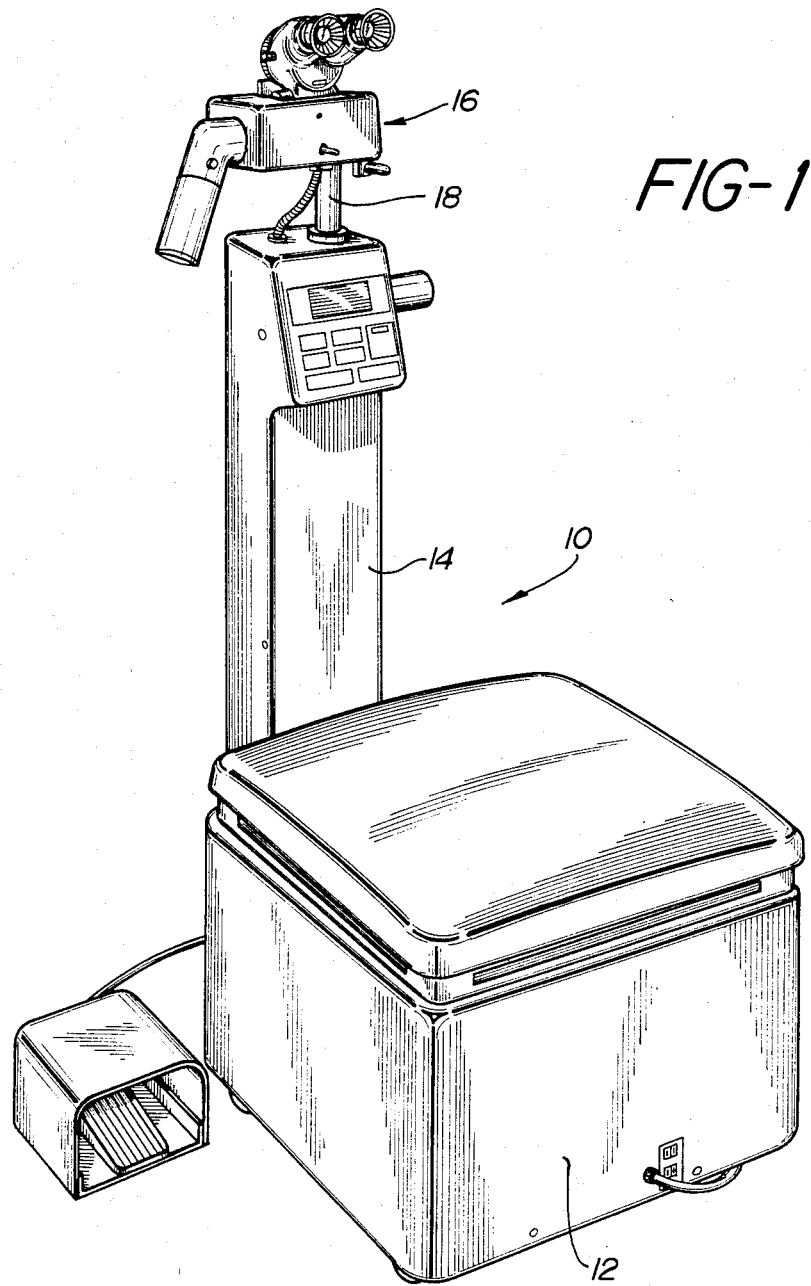
FIG. 1 is a perspective view showing a laser delivery system including a beam directing manipulator handle in accordance with the present invention.

In FIG. 1 there is shown in perspective a surgical laser device referred to generally as 10 including a cabinet 12 that houses the necessary power supplies and required electronics and which doubles as a seat for the operating physician. A generally vertical tiltable laser head housing 14 is connected to the cabinet 12. Laser head housing 14 supports a removable colposcope or operating microscope delivery system referred to generally as 16.

The laser head housing 14 contains a carbon dioxide laser that is used for treatment, such as a Laakmann ElectroOptics, Inc. rf excited waveguide laser, and a helium-neon laser used for aiming purposes since the beam of the carbon dioxide laser is invisible to the human eye. The beams of the two lasers are combined by a method well known to those familiar with the art, and are directed upward to the colposcope 16 through its support stem 18 which is axially hollow so that the beams can propagate along its central or longitudinal axis. The laser head housing 14 is designed to pivot and can be tilted in any direction about the vertical; thus, allowing for the approximate aiming of the delivery system 16 onto a prescribed target plane 20, such as shown in FIG. 2.

Figure 2:
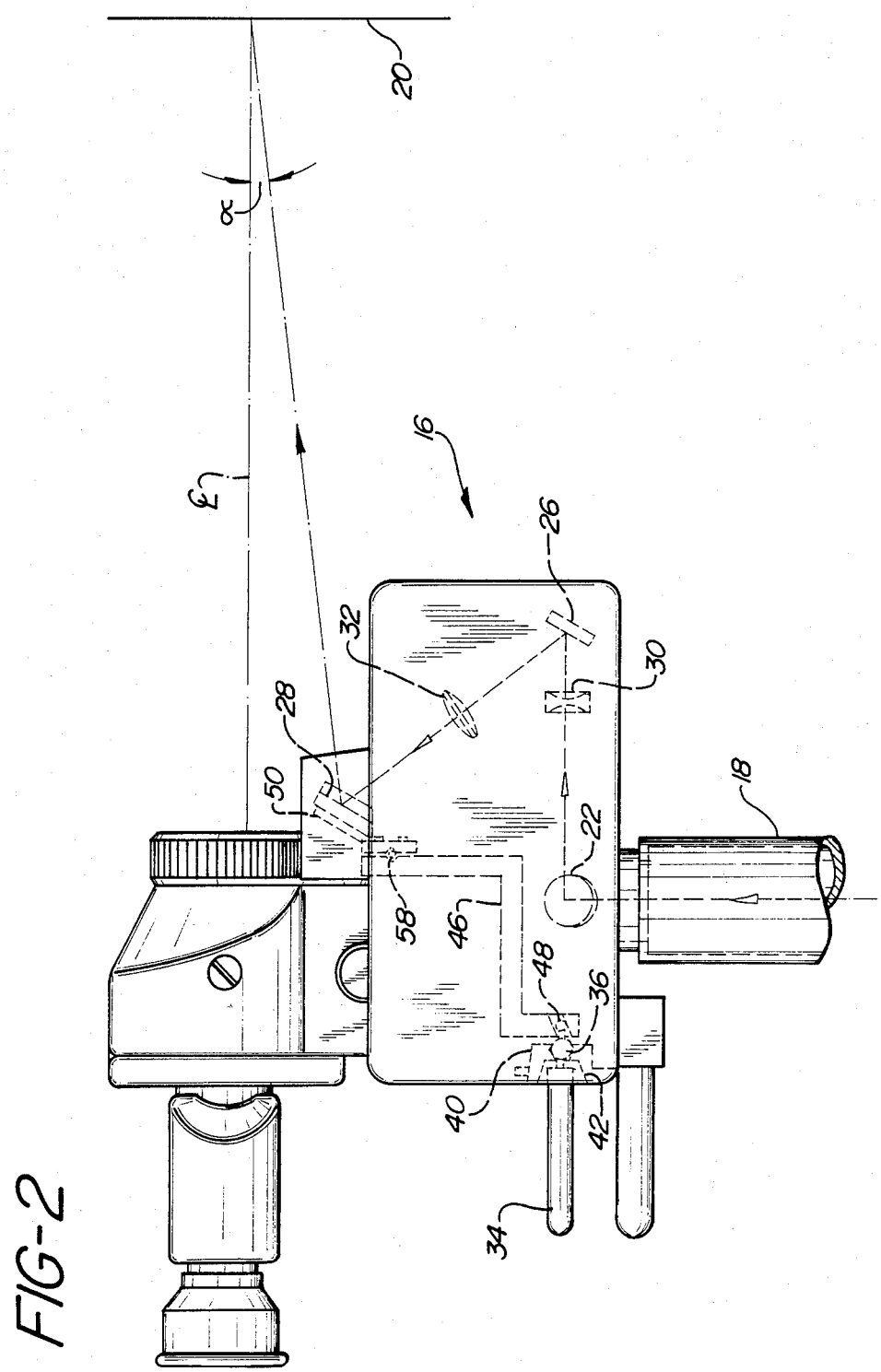
FIG. 2 is an elevational view of the optical head assembly of FIG. 1 shown on an enlarged scale.

The operating microscope delivery system 16 is shown on an enlarged scale in greater detail in FIG. 2. In normal operation, the laser beam is directed upward through the stem 18 and then by a series of beam deflecting mirrors 22, 24, 26, and 28. The first three of these mirrors—22, 24, and 26—are precision mounted in fixed orientation so that each reflects the oncoming beam 90 degrees along an axis orthogonal to the previous path of the beam. The last mirror 28 is the mirror which controls the site at which the laser beam strikes the target plane 20. A diverging lense 30 and a converging lense 32 are provided along the path of the laser beam to provide for the desired focusing of the laser beam by the operating physician. The last mirror 28 is controlled by a micromanipulator assembly which includes a manipulator handle or a joy-stick 34 as will be described in greater detail below. When the manipulator handle 34 is in its horizontal orientation, as shown in FIG. 2, the last mirror 28 is arranged to deflect the laser beam an angle α relative to the horizontal so that the beam strikes the target plane 20 at a point coincident with the center line of sight of the viewing optics. In the preferred embodiment, the target plane 20 is separated from the viewing optics by one foot and the angle α is seven degrees.

Figure 3:
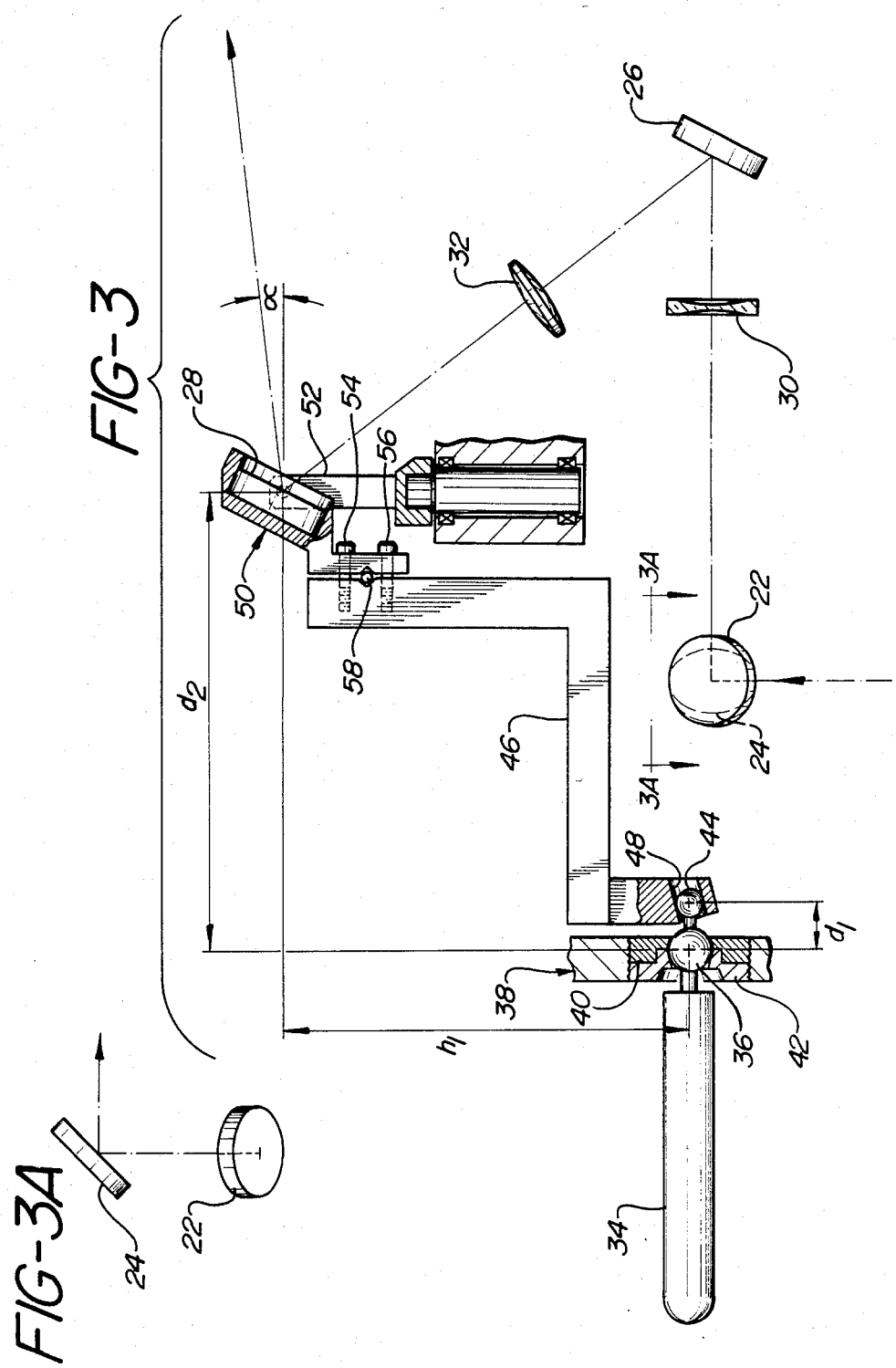
FIG. 3 is an elevational view, partially in section, of the micromanipulator assembly and illustrating also several of the beam redirecting mirrors of the laser delivery system.

As illustrated in greater detail in FIG. 3, the beam deflection is accomplished by the handle 34 which includes a first large spherical member 36 which serves as a fulcrum and represents a fixed point. The sphere 36 is retained in pivot assembly 38 which permits the manipulator handle 34 to be pivoted universally as shown by the arrows in FIG. 4. Pivot assembly 38 is provided with a generally cylindrical retaining member 40 as well as a rotatable insert 42 which provides for tension adjustment of the manipulator handle. Connected to the first large sphere 36 is a second smaller sphere or movable member 44, preferably made of stainless steel. Since the first sphere 36 acts as a fulcrum, movement of the manipulator handle 34 in any direction will result in movement of the second sphere 44 in the opposite direction. The internal end of the manipulator handle 34 is coupled to an angled manipulator arm 46 which is provided with a slanted cylindrical opening 48 that surrounds the spherical member 44. At least a portion of the manipulator arm 46 is made of brass to minimize wear between the steel sphere 44 and its points of contact. The angled manipulator arm is, in turn, connected to a mirror mount 50 which retains the last mirror 28.

Figure 4:
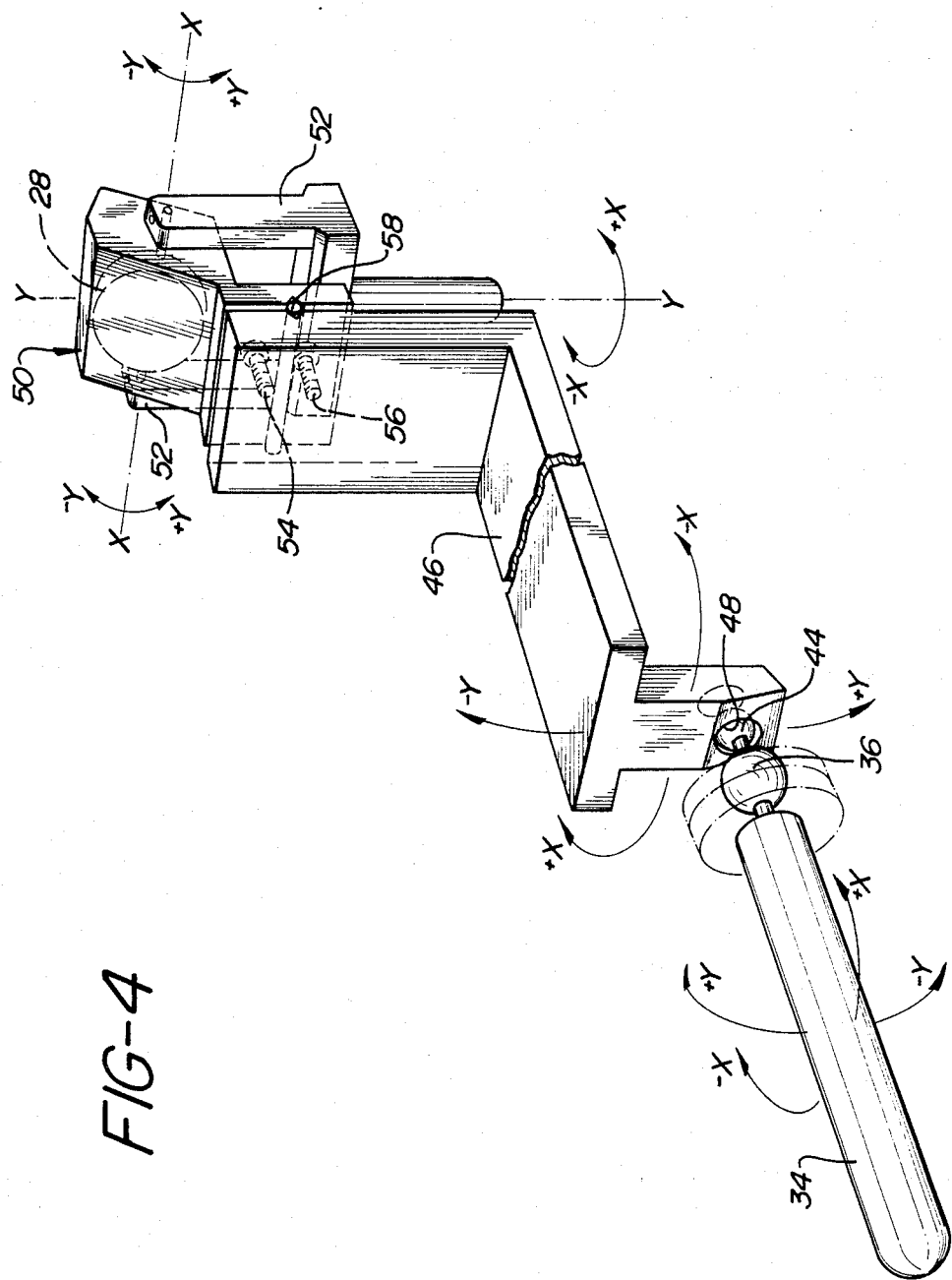
FIG. 4 is a perspective view of the micromanipulator assembly illustrating the permitted degrees of freedom.

As shown with greater clarity in FIG. 4, the mirror mount 50 includes a mirror yoke 52 which defines an axis X—X about which the mirror is pivotable whenever the handle 34 is deflected along the vertical (y) axis. The mirror yoke 52 is in turn rotatable about an axis Y—Y orthogonal to the axis X—X, such rotation being exhibited whenever the manipulator handle is deflected along the horizontal (x) axis. 46 is connected to the mirror mount 50 by a pair of fastening means such as screws 54 and 56. Mirror mount 50 is separated from manipulator arm 46 by a dowel 58 which permits fine adjustment of the orientation of the mirror mount by applying independent tension on screws 54 and 56. Thus, as the manipulator handle 34 is moved to the right as designated by the +X direction, the small sphere 44 will force the manipulator arm 46 to move to the left (+X direction) which rotates the mirror mount 50 about the Y—Y axis in the direction designated by +X. The reverse is true when the manipulator handle is moved to the left or −X direction. Likewise, when the manipulator arm is moved upward in the direction designated +Y, the small sphere 44 will move downward in the +Y direction causing the mirror to be pivoted about axis X—X in the +Y direction or counterclockwise. The opposite is true when the manipulator handle is deflected downward (−Y).

Figure 8:
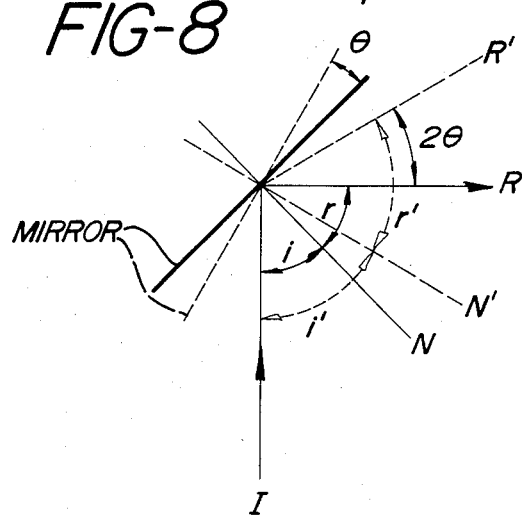
FIG. 8 is a schematic side view of a beam deflecting mirror illustrating the optical principle that the angle of incidence equals the angle of reflection and its effect when the mirror is rotated about an axis perpendicular to the plane of the beam's path.

As is well known in optics, in the ray model of light propagation, as illustrated in FIG. 8, the angles of incidence and reflection are measured with respect to the normal N to the reflecting surface, the mirror and the point where the light strikes it. The normal is a line drawn perpendicular to the surface at that point. In the representation of FIG. 8, the angles of incidence (i) and reflection (r) are equal. The incident ray, the reflected ray and the normal all lie in the same plane. As the mirror is rotated an angle theta ($\theta$) about an axis perpendicular to the paper and intersecting the point where the light strikes the mirror, the angle of reflection, assuming the path of the incident light beam I is fixed, will be two theta (2θ). Since rotation of the mirror about this axis also rotates the normal through an angle theta, the new angle of incidence is i' which equals i plus θ. Thus, the new angle of reflection is equal to the new angle of incidence and is r' which equals r plus theta. Hence, the total angle through which the light beam is deflected is now i' plus r' which equals i plus r plus 2 θ which exceeds i plus r by twice the angle theta through which the mirror was turned.

Figure 9:
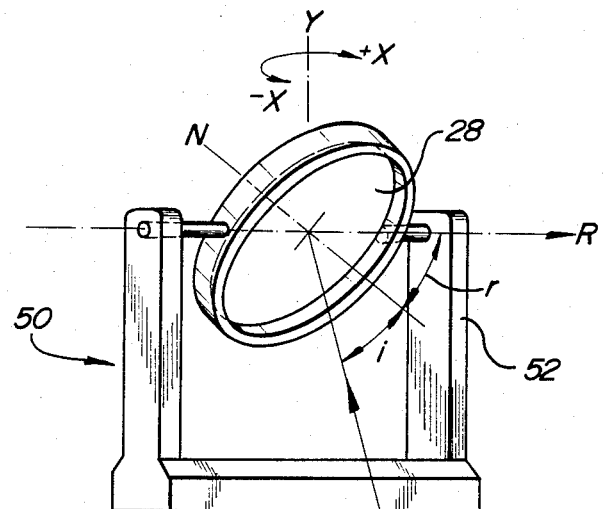
FIG. 9 is a schematic rotated side view of the mirror illustrated in FIG. 8.
Figure 10:
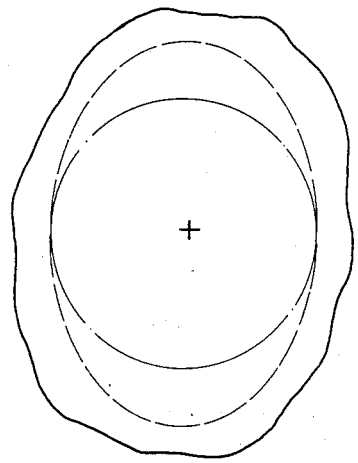
FIG. 10 is a schematic view of a section of the target plane illustrating the distortion that would be caused by the optical effect shown in FIG. 8 of a laser beam striking the target plane as the manipulator handle is rotated to circumscribe a circle.

This phenomena, however, does not occur when the mirror is rotated about an axis orthogonal to the axis of rotation of FIG. 8, such as shown in FIG. 9. In the rotation of the mirror mount 50 of FIG. 9, about axis Y—Y, the change in the angle of reflection equals the angle of rotation of the mirror. Thus, there is an optical distortion whenever the beam is deflected in the vertical axis, though none exists when the beam is deflected in the horizontal axis. The result of this selective distortion is that, uncorrected, a combination of the two degrees of rotation of the mirror mount defining a circle, as shown in FIG. 10, would yield an elliptical beam path.

Figure 6A:
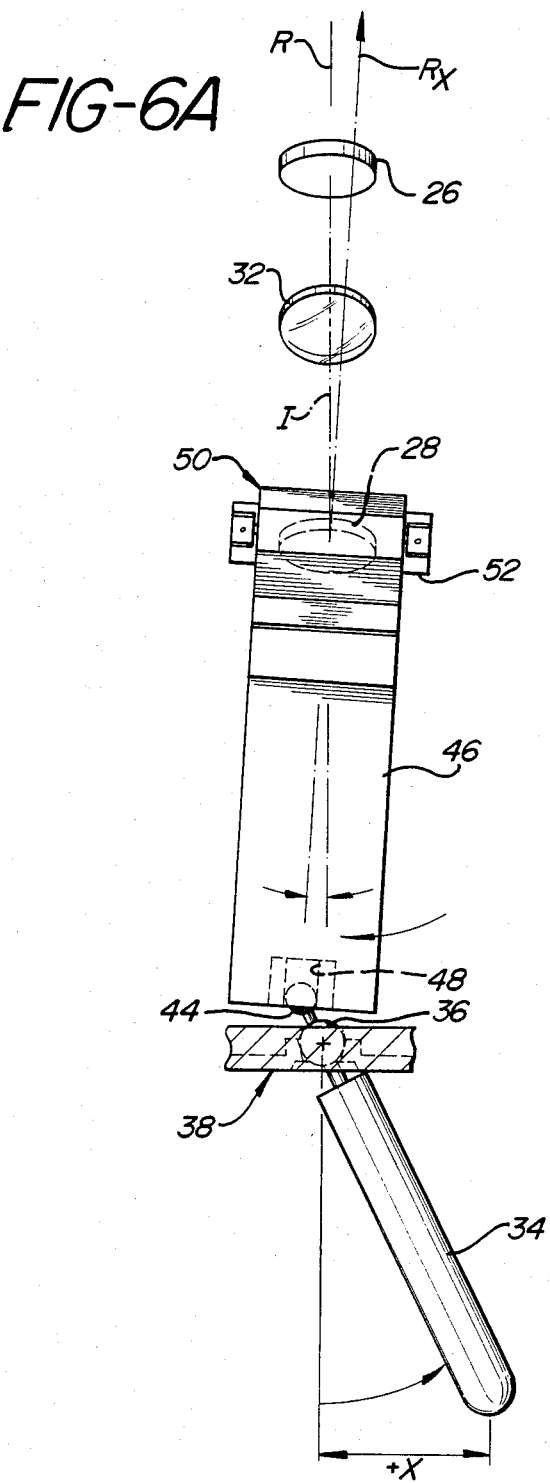
FIG. 6A is a schematic top plan view showing the manipulator handle deflected in the horizontal orientation.
Figure 6B:
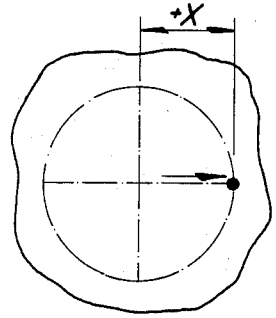
FIG. 6B is a schematic view of a section of the target plane showing the incidence of the laser beam on the target plane corresponding to the position of the manipulator handle in FIG. 6A.
Figure 7:
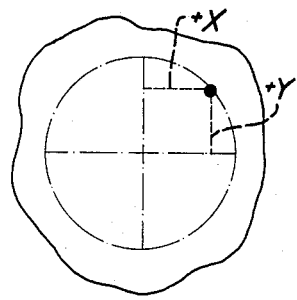
FIG. 7 is a schematic view of the target plane showing the incidence of the laser beam when movement of the manipulator handle has both a horizontal and vertical component.

The inventive mechanism described herein compensates for this distortion problem and does so without the need for springs or complex mechanical linkages. For example, as shown in FIG. 5A, a movement in the handle 34 in the direction +Y results in a counterclockwise pivot of the mirror mount 50 an amount (R to Ry) that results in the incidence of the target beam on the plane 20 to be moved in the vertical direction a like distance +Y, as shown in FIG. 5B. Likewise, as shown in FIG. 6A, a horizontal deflection of the manipulator arm 34 a distance +X results in a corresponding movement of the manipulator arm 46 and hence, in the rotatable mirror mount 50 about axis Y—Y (R to Rx) an amount which results in the laser beam striking the target plane a corresponding distance +X from the center point. In the preferred embodiment illustrated in FIG. 3, the slant of the cylindrical opening 48 is 13 degrees relative to the horizontal. It will be appreciated that this slant is a function of the specific geometry and dimensions of the described system, wherein the distance $d_1$ between the center points of the two spheres 36 and 44 is 0.25 inches, the vertical distance $h_1$ between the center point of large sphere 36 and the axis X—X about which the mirror mount rotates is 2.4 inches, and the horizontal distance $d_2$ between the center point of sphere 36 and axis X—X is 2.6 inches.

When the manipulator handle 34 is moved to a point where it has both a horizontal and a vertical component, the mirror mount 50 will be pivoted about axis X—X as well as rotated about axis Y—Y resulting in the incidence of the laser beam on the target plane at a vector from the center point of the plane corresponding to the X,Y position of the manipulator handle relative to the center point of sphere 36. Thus, if the manipulator handle 34 were to circumscribe a circle, the impact on the target plane by the laser beam would also yield a circle of equal radius.

Thus, if the surgeon is operating on a region of the patient, his movement of the manipulator handle 34 requires no compensation since its motion in all directions and in a consistent fashion will be faithfully reproduced on the target plane.

I claim:

1. In an optical system employing a manipulable beam redirecting means for guiding a beam along a target surface, a distortion correcting micromanipulator for manipulating said redirecting means, and in turn said beam on said surface, comprising:
   (a) yoke means for changing said beam redirecting means and providing said redirecting means with two degrees of rotational freedom;
   (b) an extension arm affixed on a proximate end to said beam redirecting means, and terminating freely movably at a distal end, movement of said distal end producing corresponding rotational movement of said redirecting means;
   (c) a manipulator lever having a handle on one end, an intermediate fulcrum, and a terminus on the other end; and
   characterized in that
   (d) said extension arm defines on its distal end, an elongated channel adapted to receive said terminus of said lever, said channel having predetermined angular displacement corresponding to the rotational degree of freedom of said redirecting means to be distortion corrected, said terminus being slidably engaged within said channel, relative slippage along said angular displacement providing corresponding corrected rotation of said beam redirecting means.

2. A micromanipulator as described in claim 1 wherein said channel is cylindrical and said terminus is spherical and slidably close fitting within said channel, and wherein said channel is angularly displaced vertically toward the proximate end of said extension arm.

* * * * *